(12) United States Patent
Nohara

(10) Patent No.: US 12,744,844 B2
(45) Date of Patent: Sep. 22, 2026

(54) MOBILE TERMINAL

(71) Applicant: PACIFIC INDUSTRIAL CO., LTD., Ogaki (JP)

(72) Inventor: Kazuki Nohara, Gifu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 290 days.

(21) Appl. No.: 18/689,169

(22) PCT Filed: Jun. 7, 2023

(86) PCT No.: PCT/JP2023/021210
§ 371 (c)(1),
(2) Date: Mar. 5, 2024

(87) PCT Pub. No.: WO2024/014193
PCT Pub. Date: Jan. 18, 2024

(65) Prior Publication Data

US 2024/0430355 A1 Dec. 26, 2024

(30) Foreign Application Priority Data

Jul. 15, 2022 (JP) ................................ 2022-113657

(51) Int. Cl.
*H04M 1/72463* (2021.01)
*H04B 17/318* (2015.01)
(Continued)

(52) U.S. Cl.
CPC ...... *H04M 1/72463* (2021.01); *H04B 17/328* (2023.05); *H04M 1/72454* (2021.01);
(Continued)

(58) Field of Classification Search
CPC ......... H04M 1/72463; H04M 1/72454; H04M 1/72457; H04B 17/328; H04W 4/027;
(Continued)

(56) References Cited

U.S. PATENT DOCUMENTS 6,314,366 B1 * 11/2001 Farmakis .............. B60R 25/102 340/961
2010/0248662 A1 * 9/2010 Sheynblat ......... H04W 52/0274 455/127.1

(Continued)

FOREIGN PATENT DOCUMENTS

JP H10-21439 A 1/1998
JP 2002-029606 A 1/2002

(Continued)

OTHER PUBLICATIONS

Aug. 22, 2023 International Search Report issued in International Patent Application No. PCT/JP2023/021210.

(Continued)

*Primary Examiner* — Farid Seyedvosoghi
(74) *Attorney, Agent, or Firm* — Oliff PLC

(57) ABSTRACT

A mobile terminal configured to move together with a cargo, to acquire position data from a GPS module, and to wirelessly transmit position information based on the position data to a communication network via a wireless base station includes a communication control apparatus configured to prohibit the wireless transmission in a case where any one of a plurality of wireless transmission prohibition conditions is satisfied. The plurality of wireless transmission prohibition conditions includes a first wireless transmission prohibition condition that a current position based on the position data is a wireless transmission prohibited area and a second wireless transmission prohibition condition that a reference signal received power (RSRP) of a signal transmitted from the wireless base station is smaller than a preset reference value. The communication control apparatus is configured to determine whether the second prohibition condition is satisfied on condition that the first prohibition condition is not satisfied.

4 Claims, 4 Drawing Sheets

(51) Int. Cl.

| | |
|---|---|
| ***H04M 1/72454*** | (2021.01) |
| ***H04M 1/72457*** | (2021.01) |
| ***H04W 4/02*** | (2018.01) |
| ***H04W 4/029*** | (2018.01) |

(52) U.S. Cl.
CPC ....... *H04M 1/72457* (2021.01); *H04W 4/027* (2013.01); *H04W 4/029* (2018.02)

(58) Field of Classification Search
CPC ....... H04W 4/029; H04W 4/021; H04W 4/35; H04W 48/02; H04W 52/02; Y02D 30/70
See application file for complete search history.

(56) References Cited

U.S. PATENT DOCUMENTS

| | | | | |
|---|---|---|---|---|
| 2018/0302768 | A1 | 10/2018 | Uchiyama | |
| 2019/0246250 | A1 | 8/2019 | Uchiyama | |
| 2019/0320491 | A1 * | 10/2019 | Shukair | H04B 17/327 |

FOREIGN PATENT DOCUMENTS

| | | | | |
|---|---|---|---|---|
| JP | 2003-189365 | A | | 7/2003 |
| JP | 4989770 | B2 | | 8/2012 |
| JP | 2014-015295 | A | | 1/2014 |
| JP | 2017-139658 | A | | 8/2017 |
| JP | 2019210131 | A | * | 12/2019 |
| JP | 2020-021420 | A | | 2/2020 |
| JP | 2020-113943 | A | | 7/2020 |

OTHER PUBLICATIONS

Nov. 1, 2022 Office Action issued in Japanese Patent Application No. 2022-113657.
Mar. 16, 2023 Office Action issued in Japanese Patent Application No. 2022-113657.
Jan. 22, 2025 Search Report issued in European Patent Application No. 23839369.8.
Feb. 3, 2025 Office Action issued in European Patent Application No. 23839369.8.

* cited by examiner 100
101
50
300
400
401
70
10
P
AIRPORT AREA

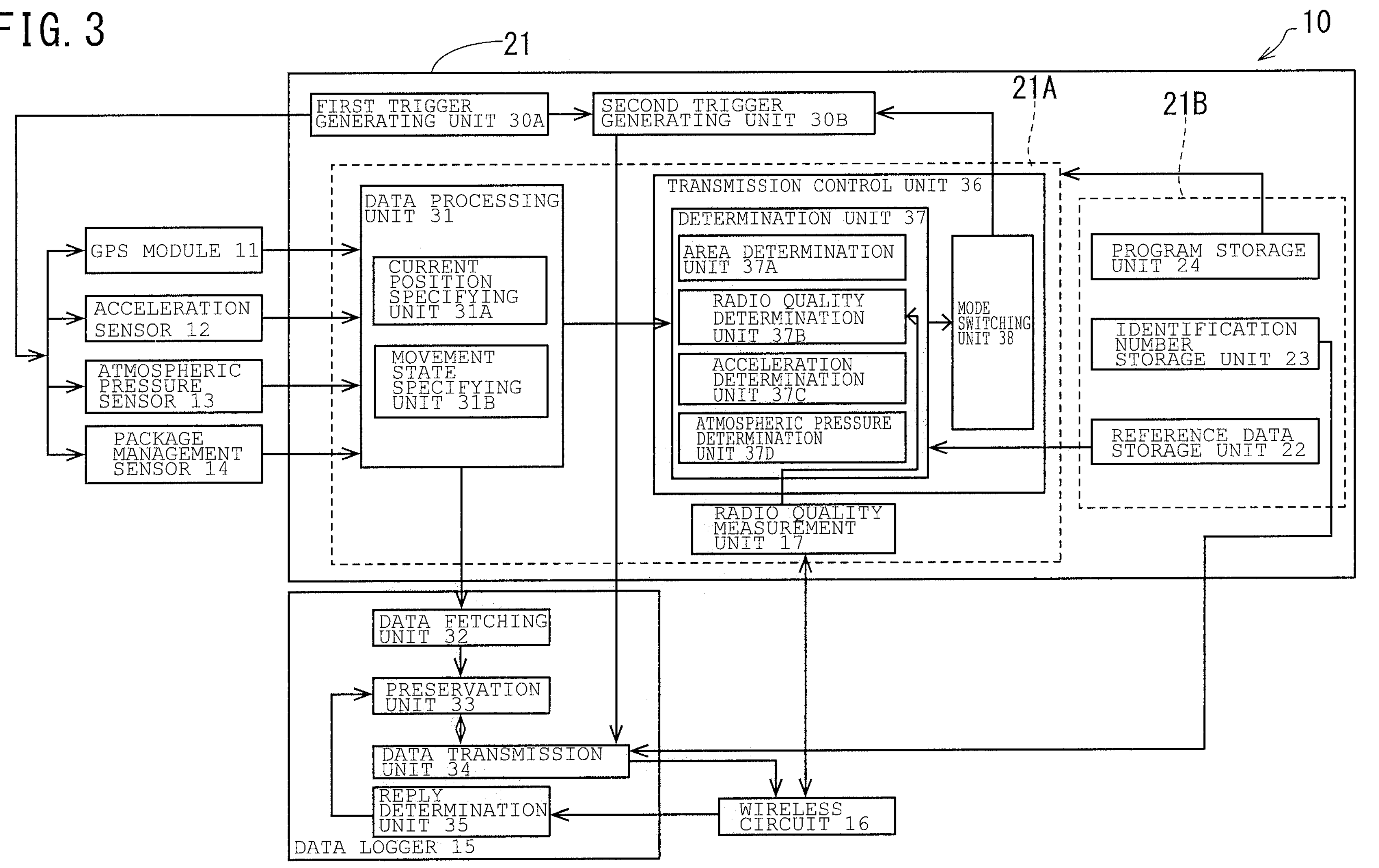
FIG. 3
10
21
21A
21B
FIRST TRIGGER GENERATING UNIT 30A
SECOND TRIGGER GENERATING UNIT 30B
DATA PROCESSING UNIT 31
CURRENT POSITION SPECIFYING UNIT 31A
MOVEMENT STATE SPECIFYING UNIT 31B
TRANSMISSION CONTROL UNIT 36
DETERMINATION UNIT 37
AREA DETERMINATION UNIT 37A
RADIO QUALITY DETERMINATION UNIT 37B
ACCELERATION DETERMINATION UNIT 37C
ATMOSPHERIC PRESSURE DETERMINATION UNIT 37D
MODE SWITCHING UNIT 38
PROGRAM STORAGE UNIT 24
IDENTIFICATION NUMBER STORAGE UNIT 23
REFERENCE DATA STORAGE UNIT 22
RADIO QUALITY MEASUREMENT UNIT 17
GPS MODULE 11
ACCELERATION SENSOR 12
ATMOSPHERIC PRESSURE SENSOR 13
PACKAGE MANAGEMENT SENSOR 14
DATA FETCHING UNIT 32
PRESERVATION UNIT 33
DATA TRANSMISSION UNIT 34
REPLY DETERMINATION UNIT 35
DATA LOGGER 15
WIRELESS CIRCUIT 16

MOBILE TERMINAL

TECHNICAL FIELD

The present disclosure relates to a mobile terminal that wirelessly transmits information using a wireless communication network.

BACKGROUND ART

In recent years, mobile terminals have become widespread. In addition, a communication environment of a mobile terminal varies depending on a place (see, for example, Patent Document 1).

RELATED ART DOCUMENTS

Patent Documents

Patent Document 1: JP 2020-113943 A (paragraphs [0006] to [0008] and FIG. 3)

SUMMARY OF THE INVENTION

Problems to be Solved by the Invention

However, the conventional mobile terminal has a problem in that wasteful power is consumed because wireless transmission is repeated even in a place where a communication environment is not good, and measures therefor are required.

Means of Solving the Problems

A first aspect of the present disclosure made to solve the above problem is a mobile terminal configured to move together with a cargo, to acquire position data from a GPS module, and to perform wireless transmission of position information based on the position data to a communication network via a wireless base station, the mobile terminal including a communication control apparatus configured to prohibit the wireless transmission in a case where any one of a plurality of wireless transmission prohibition conditions is satisfied, the plurality of wireless transmission prohibition conditions including a first wireless transmission prohibition condition that a current position based on the position data is a wireless transmission prohibited area and a second wireless transmission prohibition condition that a reference signal received power (RSRP) of a signal transmitted from the wireless base station is smaller than a preset reference value, in which the communication control apparatus is configured to determine whether or not the second wireless transmission prohibition condition is satisfied on condition that the first wireless transmission prohibition condition is not satisfied.

BRIEF DESCRIPTION OF THE DRAWINGS

FIG. 3 is a block diagram illustrating a control configuration of the cargo management device.

MODE FOR CARRYING OUT THE INVENTION

First Embodiment

Figure 1:
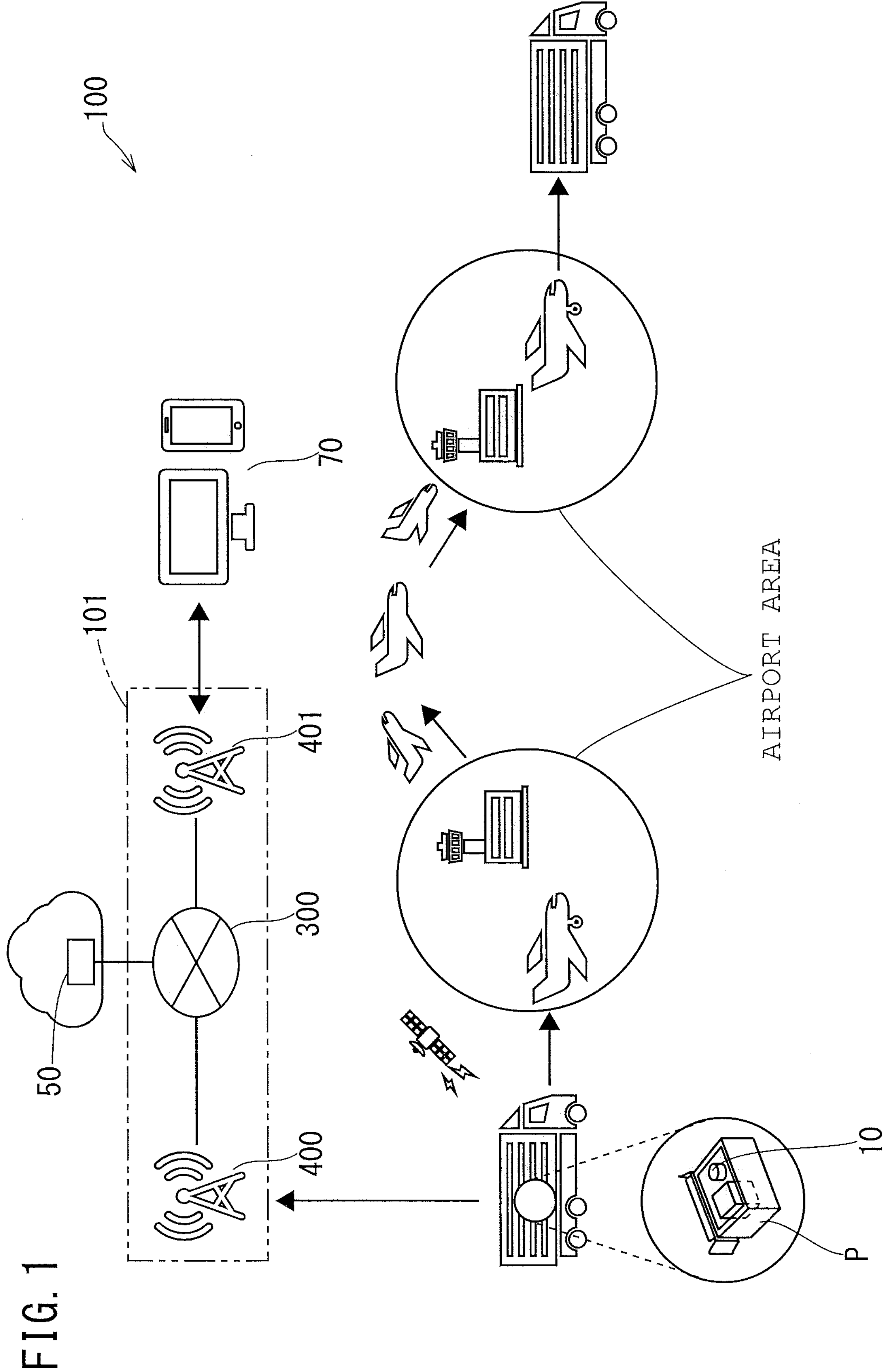
FIG. 1 is a schematic diagram illustrating an overall configuration of a cargo monitoring system according to a first embodiment.

A cargo monitoring system 100 according to a first embodiment of the present disclosure will be described with reference to FIGS. 1 to 4. The cargo monitoring system 100 of the present embodiment is a system that grasps a transport status of a cargo P that is a target to be managed, and includes, as illustrated in FIG. 1, a cargo management device 10 that moves together with the cargo P and acquires information regarding the transport status, a cloud server 50, and an external terminal 70. The cargo management device 10, the cloud server 50, and the external terminal 70 are connected via a communication network 101 including wireless base stations 400, 401. Note that the cargo management device 10 corresponds to a "mobile terminal" in the claims.

Note that the cloud server 50 receives the information regarding the transport status acquired by the cargo management device 10, manages the transport status such as the movement trajectory of the cargo management device 10 and the transport condition during movement in time series, and gives the information to the external terminal 70 in a case where there is an abnormality in the transport status, in a case where there is a request from the external terminal 70, or the like. The external terminal 70 is, for example, a terminal held by a shipper, a receiver of the cargo P, or the like.

Figure 2:
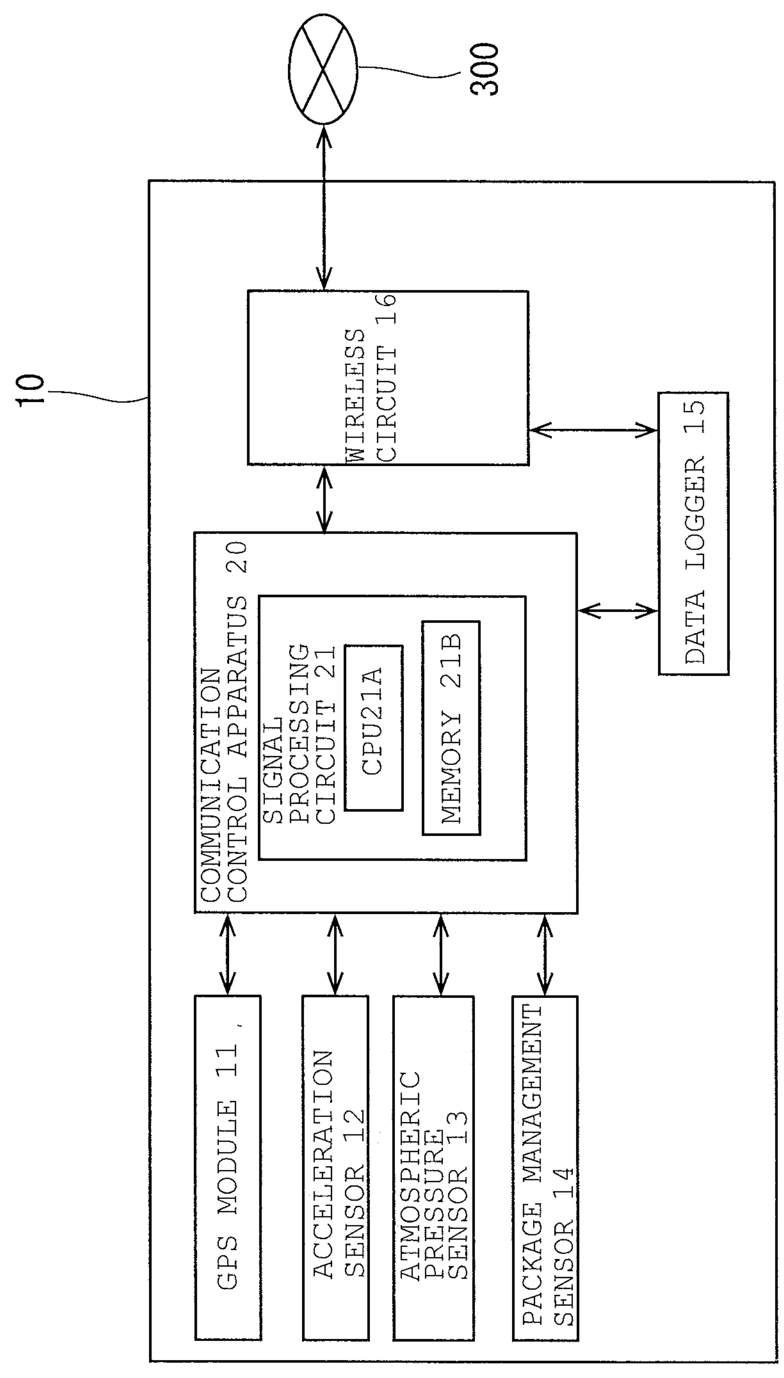
FIG. 2 is a block diagram illustrating an electrical configuration of a cargo management device.

As illustrated in FIG. 2, the cargo management device 10 includes a GPS module 11, an acceleration sensor 12, an atmospheric pressure sensor 13, a cargo management sensor 14, a communication control apparatus 20, a data logger 15, and a wireless circuit 16. Note that the cargo management device 10 includes a battery (not illustrated) that supplies power to the GPS module 11, the acceleration sensor 12, the atmospheric pressure sensor 13, the cargo management sensor 14, the communication control apparatus 20, the wireless circuit 16, and the like. The battery may be, for example, a primary battery, a secondary battery, or the like, or may be a capacitor.

The GPS module 11 receives a GPS satellite signal and calculates position data of the cargo management device 10 (cargo P). The calculated position data is output to the communication control apparatus 20. The current position of the cargo management device 10 is specified by the position data.

The acceleration sensor 12 detects a physical quantity accompanying the movement of the cargo management device 10, and detects a movement direction and acceleration at that time. The acceleration sensor 12 outputs the detected acceleration data to the communication control apparatus 20. The movement state of the cargo management device 10, for example, a movement state such as speeding up, slowing down, or being standstill is specified by the acceleration data. In addition, physical property values related to impact and vibration can also be acquired from the acceleration data.

The atmospheric pressure sensor 13 detects an atmospheric pressure applied to the cargo management device 10. The detected atmospheric pressure data is output to the communication control apparatus 20.

In the present embodiment, a temperature sensor, a humidity sensor, and an illuminance sensor are provided as the cargo management sensor 14, and physical property value data such as temperature, humidity, and illuminance around the cargo management device 10 is acquired. The cargo management sensor 14 may be configured to include some of the temperature sensor, the humidity sensor, and the illuminance sensor, or may be configured to include a sensor that measures another physical property value in addition to these sensors.

The communication control apparatus 20 includes a signal processing circuit 21 including a CPU 21A and a memory 21B such as a RAM, a ROM, and a flash memory. The CPU 21A of the signal processing circuit 21 is connected to the GPS module 11, the acceleration sensor 12, the atmospheric pressure sensor 13, the cargo management sensor 14, the data logger 15, the wireless circuit 16, and the like, and controls them to execute a data processing program and a communication control program PG1 described later.

The memory 21B includes a reference data storage unit 22 in which map data and the like covering the transport range of the cargo P is stored, an identification number storage unit 23 in which an identification number of the cargo management device 10 is stored, a program storage unit 24 in which the data processing program, the communication control program PG1, and the like are stored, and the like (see FIG. 3).

The data processing program is executed while power is supplied from the battery to the communication control apparatus 20. Then, the CPU 21A executes the data processing program to function as a control block of a first trigger generating unit 30A, a second trigger generating unit 30B, a data processing unit 31, and the like (see FIG. 3). The communication control program PG1 will be described in detail later.

In the first trigger generating unit 30A, a measurement trigger is generated every certain period (for example, 1 minute), and the GPS module 11, the acceleration sensor 12, the atmospheric pressure sensor 13, and the cargo management sensor 14 perform measurement each time the measurement trigger is generated. Then, the data processing unit 31 fetches the GPS position data calculated by the GPS module 11, the acceleration data detected by the acceleration sensor 12, the atmospheric pressure data detected by the atmospheric pressure sensor 13, and the physical property value data detected by the cargo management sensor 14.

The data processing unit 31 includes a current position specifying unit 31A and a movement state specifying unit 31B. The current position specifying unit 31A specifies current position data indicating the current position of the cargo management device 10 from the GPS position data. The movement state specifying unit 31B specifies movement data including a movement direction of the cargo management device 10 and an acceleration at that time, a movement state such as speeding up, slowing down, or being standstill, and a physical property value related to impact or vibration from the acceleration data. Then, the data processing unit 31 gives these data to the data logger 15 together with the atmospheric pressure data and the physical property value data in association with the measurement time. Here, there is a case where the GPS module 11 cannot receive a GPS satellite signal due to an influence of topography or a building, and in such a case, the data processing unit 31 cannot acquire position data, and thus, only movement data, atmospheric pressure data, and physical property value data are given to the data logger 15.

The data logger 15 collects the current position data, the movement data, the atmospheric pressure data, and the physical property value data acquired from the data processing unit 31, and collectively stores them in time series. The data logger 15 includes a data fetching unit 32, a storage unit 33, a data transmission unit 34, and a reply determination unit 35.

The data fetching unit 32 fetches the current position data, the movement data, the atmospheric pressure data, and the physical property value data specified by the data processing unit 31, generates transport status data D1 collected for each measurement time, and stores the transport status data D1 in the storage unit 33. As described above, when the GPS module 11 cannot receive the GPS satellite signal, only the movement data, the atmospheric pressure data, and the physical property value data are stored in the transport status data D1.

Every time the transmission trigger is generated at a predetermined cycle (for example, 10 [min]) by the second trigger generating unit 30B, the data transmission unit 34 stores the plurality of pieces of transport status data D1 accumulated in the storage unit 33 and the identification number of the cargo management device 10 read from the identification number storage unit 23 in a data frame having a predetermined data length to generate transmission data D2, and wirelessly transmits the transmission data D2 using the wireless circuit 16. The transmission data D2 is received by the cloud server 50 from the wireless base stations 400, 401 via a general-purpose communication line 300.

The wireless circuit 16 performs wireless communication with the wireless base stations 400, 401. The wireless base stations 400, 401 are, for example, wireless base stations of a communication system defined in the LTE standard. The wireless base stations 400, 401 periodically transmit a predetermined reference signal for measuring the communication quality (radio quality) of the wireless communication. As will be described in detail later, in the present embodiment, the wireless circuit 16 receives the reference signal, and the communication control apparatus 20 calculates RSRP indicating received power received from the wireless base stations 400, 401 on the basis of the reference signal. Note that RSRP is an abbreviation of Reference Signal Received Power, and is an average value of received power observed within a predetermined period. Note that the wireless base stations 400, 401 of the present embodiment adopt a communication system defined in the LTE standard, but are not limited thereto, and may adopt a communication system defined in 3G, 4G, 5G, or other standards. In such a case, the communication control apparatus 20 calculates a value indicating the received power corresponding to the RSRP on the basis of the reference signal transmitted by the wireless base stations 400, 401.

When the transmission data D2 transmitted by the data transmission unit 34 is received by the cloud server 50, the reply determination unit 35 determines that the transmission data D2 is received by the cloud server 50 by receiving an ACK signal to be returned from the cloud server 50.

Upon receiving the ACK signal, the reply determination unit 35 determines that the transmission data D2 has been received by the cloud server 50, and deletes the transport status data DI included in the transmission data D2 from the storage unit 33. Here, in a case where the cargo management device 10 moves to a place where the communication environment is not good, wireless communication cannot be performed with the wireless base stations 400, 401, and the transmission data D2 transmitted by the cargo management device 10 is not received by the cloud server 50 in some cases. In such a case, the reply determination unit 35 of the cargo management device 10 determines that the transmission data D2 has not been received by the cloud server 50 on condition that there is no reply of the ACK signal from the cloud server 50 for a certain period, and keeps stored the transport status data D1 included in the transmission data D2 that has not been received in the storage unit 33. Then, the data transmission unit 34 generates and transmits the transmission data D2 including those transport status data D1 at a timing when the next transmission data D2 is transmitted.

In addition, as will be described later, execution of the communication control program PG1 by the CPU 21A prohibits wireless transmission by the wireless circuit 16 in some cases. At this time, the generation of the transmission trigger by the second trigger generating unit 30B is stopped. As a result, the data transmission unit 34 does not generate the transmission data D2, and the transport status data DI remains stored in the storage unit 33. Then, when the prohibition of the wireless transmission by the wireless circuit 16 is canceled, the generation of the transmission trigger by the second trigger generating unit 30B is resumed, and the data transmission unit 34 generates and transmits the transmission data D2 including those transport status data D1 at the timing of transmitting the next transmission data D2.

Meanwhile, as described above, the communication control apparatus 20 of the present embodiment has a function of prohibiting the periodic wireless transmission of the transmission data D2 by the data transmission unit 34.

Specifically, the CPU 21A of the signal processing circuit 21 of the communication control apparatus 20 executes the communication control program PG1 to switch between a normal transmission mode in which regular transmission by the wireless circuit 16 is performed as usual and a transmission prohibition mode in which wireless transmission is prohibited. Note that, in the initial state, the normal transmission mode is set.

When the communication control program PG1 is executed, the CPU 21A functions as a transmission control unit 36, a radio quality measurement unit 17, and the like illustrated in FIG. 3. Here, as described above, the data processing unit 31 fetches the data measured by the GPS module 11, the acceleration sensor 12, the atmospheric pressure sensor 13, and the cargo management sensor 14 and outputs the data to the data logger 15, and among such pieces of data, the current position data, the movement data, and the atmospheric pressure data are also given to a determination unit 37 described later of the transmission control unit 36. Then, the communication control program PG1 is executed every time these pieces of data are fetched by the determination unit 37.

As described above, the radio quality measurement unit 17 calculates the RSRP, which is a parameter indicating the radio quality, on the basis of the reference signal transmitted by the wireless base stations 400, 401. The calculated RSRP is given to the determination unit 37. Note that the RSRP may be a median value of received power observed within a predetermined period, or may be an average value or a median value of a data group obtained by excluding a maximum value, a minimum value, or an outlier from a set of received power observed within a predetermined period. Furthermore, in the present embodiment, the RSRP is calculated as the parameter indicating the radio quality from the received reference signal, but the parameter is not limited to the RSRP, and may be, for example, a Received Signal Strength Indicator (RSSI) or a Signal to Interference Noise power Ratio (SINR).

The transmission control unit 36 includes the determination unit 37 and a mode switching unit 38. The determination unit 37 includes an area determination unit 37A, a radio quality determination unit 37B, an acceleration determination unit 37C, and an atmospheric pressure determination unit 37D. The transmission control unit 36 determines whether or not to prohibit wireless transmission on the basis of the determination results of the determination units 37A to 37D, and the mode switching unit 38 switches the wireless circuit 16 to the normal transmission mode or the transmission prohibition mode.

The area determination unit 37A collates the current position data acquired from the data processing unit 31 with the map data stored in the reference data storage unit 22 to determine whether or not the current position of the cargo management device 10 is within a wireless transmission prohibited area. Hereinafter, the current position of the cargo management device 10 being within the wireless transmission prohibited area will be referred to as a first wireless transmission prohibition condition. In the present embodiment, the wireless transmission prohibited area is set as an airport area.

Here, as described above, in some cases, the GPS module 11 is not able to receive the GPS satellite signal, and the current position data is not given from the data processing unit 31 to the determination unit 37. In such a case, since the current position of the cargo management device 10 cannot be specified, the area determination unit 37A does not determine whether or not the first wireless transmission prohibition condition is satisfied, and judges that the determination is impossible.

The radio quality determination unit 37B determines whether or not the value of the RSRP calculated by the radio quality measurement unit 17 is smaller than a reference value. The RSRP indicates that the larger the value is, the easier place the cargo management device 10 is located at for communication with the wireless base stations 400, 401. In the present embodiment, the reference value is set to a value of a case where wireless transmission cannot be performed due to a poor communication environment, and when the value of RSRP is smaller than the reference value, it is determined that transmission cannot be performed due to the poor communication environment of the cargo management device 10. Hereinafter, the value of the RSRP being smaller than the reference value is referred to as a second wireless transmission prohibition condition. Note that the reference value is stored in the reference data storage unit 22.

The acceleration determination unit 37C determines whether or not the movement direction of the cargo management device 10 specified by the movement data acquired from the data processing unit 31 and the acceleration at that time correspond to speeding up at the time of takeoff or slowing down at the time of landing of an aircraft. The acceleration determination unit 37C determines that the cargo management device 10 is in the taking-off aircraft when the movement direction and the acceleration at that time correspond to speeding up at the time of takeoff of the aircraft, and determines that the cargo management device is in the landing aircraft when the movement direction and the acceleration at that time correspond to slowing down at the time of landing of the aircraft. Hereinafter, the movement direction of the cargo management device 10 and the acceleration at that time corresponding to speeding up at the time of takeoff of the aircraft is referred to as a third wireless transmission prohibition condition, and the moving direction and the acceleration at that time not corresponding to slowing down at the time of landing of the aircraft is referred to as a fourth wireless transmission prohibition condition. Note that reference data for determining speeding up at the time of takeoff or slowing down at the time of landing of the aircraft is stored in the reference data storage unit 22. Note that the acceleration determination unit 37C corresponds to a "takeoff and landing detection unit" in the claims.

The atmospheric pressure determination unit 37D determines whether or not the pressure applied to the cargo management device 10 specified by the atmospheric pressure data acquired from the data processing unit 31 is lower than a reference pressure. Here, the pressure in the flying aircraft is adjusted to a pressure (for example, 0.8 atm) lower than 1 atm, which is the atmospheric pressure on the ground, in order to reduce the influence of the atmospheric pressure change. When the pressure applied to the cargo management device 10 is lower than the reference pressure, the atmospheric pressure determination unit 37D determines that the cargo management device 10 is in the flying aircraft. Hereinafter, the pressure applied to the cargo management device 10 being lower than the reference pressure will be referred to as a fifth wireless transmission prohibition condition. Note that the reference pressure is set between 0.8 atm and 1 atm, for example, and is stored in the reference data storage unit 22.

In the present embodiment, when the wireless circuit 16 is set to the normal transmission mode, the transmission control unit 36 causes the determination unit 37 to perform the determination by the area determination unit 37A first. Then, when the area determination unit 37 determines that the cargo management device 10 is located in the airport area (when the first wireless transmission prohibition condition is satisfied), the determination by the other determination units 37B to 37D is not performed, and the wireless circuit 16 is switched to the transmission prohibition mode by the mode switching unit 38.

When the area determination unit 37A determines that the first wireless transmission prohibition condition is not satisfied, the radio quality measurement unit 17 causes the wireless circuit 16 to receive the reference signal of the wireless base stations 400, 401 and calculates RSRP, and the radio quality determination unit 37B performs determination on the basis of the RSRP. That is, when the first wireless transmission prohibition condition is not satisfied, the determination is performed by the radio quality determination unit 37B. Then, when the radio quality determination unit 37B determines that the RSRP is smaller than the reference value and the communication environment is poor (when the second wireless transmission prohibition condition is satisfied), the determination by the other determination units 37C and 37D is not performed, and the wireless circuit 16 is switched to the transmission prohibition mode by the mode switching unit 38.

Furthermore, when the radio quality determination unit 37B determines that the second wireless transmission prohibition condition is not satisfied, the acceleration determination unit 37C performs determination. Then, when the acceleration determination unit 37C determines that the movement direction of the cargo management device 10 and the acceleration at that time correspond to speeding up at the time of takeoff of the aircraft (when the third wireless transmission prohibition condition is satisfied), it is determined that the cargo management device 10 is in the taking-off aircraft, that is, the cargo management device 10 is loaded on the aircraft, and the determination by the atmospheric pressure determination unit 37D is not performed, and the wireless circuit 16 is switched to the transmission prohibition mode by the mode switching unit 38.

Next, when the acceleration determination unit 37C determines that the third wireless transmission prohibition condition is not satisfied, the atmospheric pressure determination unit 37D performs determination. Then, when the atmospheric pressure determination unit 37D determines that the pressure applied to the cargo management device 10 is lower than the reference pressure (when the fifth wireless transmission prohibition condition is satisfied), it is determined that the cargo management device 10 is in the flying aircraft, that is, the cargo management device 10 is loaded on the aircraft, and the wireless circuit 16 is switched to the transmission prohibition mode by the mode switching unit 38. That is, when at least one of the first, second, third, and fifth wireless transmission prohibition conditions is satisfied, wireless transmission is prohibited. As a result, the generation of the transmission trigger by the second trigger generating unit 30B is stopped. Note that, as described above, in a case where the GPS module 11 cannot acquire the GPS satellite signal and the current position data is not given from the data processing unit 31, the first wireless transmission prohibition condition is not determined, and the second, third, and fifth wireless transmission prohibition conditions are determined in order.

Since the data processing program is executed even after the wireless circuit 16 has been switched from the normal transmission mode to the transmission prohibition mode, the measurement by the GPS module 11, the acceleration sensor 12, the atmospheric pressure sensor 13, and the cargo management sensor 14 is continued, and the current position data, the movement data, the atmospheric pressure data, and the physical property value data are continuously stored in the data logger 15 via the data processing unit 31 as the transport status data D1. Then, even in the transmission prohibition mode, the current position data, the movement data, and the atmospheric pressure data are continued to be given from the data processing unit 31 to the transmission control unit 36, and the communication control program PG1 is executed.

In the present embodiment, in a case where the wireless circuit 16 is set to the transmission prohibition mode, the transmission control unit 36 performs determination by the atmospheric pressure determination unit 37D, determination by the acceleration determination unit 37C, determination by the area determination unit 37A, and determination by the radio quality determination unit 37B in order in the determination unit 37. At this time, the acceleration determination unit 37C determines whether or not the movement direction of the cargo management device 10 and the acceleration at that time correspond to slowing down at the time of landing of the aircraft. The acceleration determination unit 37C determines that the aircraft is still flying or the cargo management device 10 is not loaded on the aircraft when the movement direction and the acceleration at that time do not correspond to slowing down at the time of landing of the aircraft (at this time, the fourth wireless transmission prohibition condition is satisfied). While at least one of the first, second, fourth, and fifth wireless transmission prohibition conditions is satisfied, the wireless transmission prohibition mode is maintained. In a case where none of the first, second, fourth, and fifth wireless transmission prohibition conditions is satisfied, the wireless circuit 16 is switched to the normal transmission mode by the mode switching unit 38. As a result, the generation of the transmission trigger by the second trigger generating unit 30B is resumed. Note that, as described above, in a case where the GPS module 11 cannot acquire the GPS satellite signal and the current position data is not given from the data processing unit 31, the second, fourth, and fifth wireless transmission prohibition conditions are not determined, and the transmission prohibition mode is maintained.

The configuration of the cargo monitoring system 100 of the present embodiment has been described above. In the cargo monitoring system 100 of the present embodiment, the cargo management device 10 that moves together with the cargo P as a management target object includes the GPS module 11, the acceleration sensor 12, the atmospheric pressure sensor 13, and the like, and periodically wirelessly transmits information regarding the transport status such as the current position of the cargo P to the cloud server 50 on the basis of the measurement results of the sensors, and monitors the process from shipping to receipt of the cargo P.

Here, the process from shipping to receipt of the cargo P includes movement of the cargo P by a vehicle, an aircraft, a ship, a train, a person, or the like, and temporary storage in a warehouse, a container, or the like. In a case where the cargo management device 10 (cargo P) is accommodated in a warehouse or a container, the communication environment becomes poor, and thus there is a problem in that information regarding a transport status is not received by the cloud server 50 even if the information is periodically transmitted, and wasteful power is consumed. In addition, a similar problem may occur when passing through an area with a poor communication environment, such as a deep in the mountain or a long tunnel, during transport.

To cope with this, in the present embodiment, the CPU 21A of the signal processing circuit 21 of the communication control apparatus 20 includes the transmission control unit 36, and prohibits the periodic transmission by the wireless circuit 16 when the radio quality determination unit 37B, which determines the value of the RSRP, determines that the RSRP is smaller than the reference value and the communication environment of the cargo management device 10 is poor. As a result, it is possible to prevent repetition of wireless transmission under a poor communication environment, and wasteful power consumption is suppressed. Then, the operation of the cargo management device 10 operated by the battery is made to last long, and it is possible to continue monitoring of the cargo P during longer-distance transport than before.

Furthermore, when the radio quality determination unit 37B determines that the RSRP is the reference value or more, the transmission control unit 36 recovers the periodic transmission by the wireless circuit 16. Here, for example, it is conceivable that the wireless transmission is switched between prohibition and recovery by the driver manually operating an operation unit provided on the outer surface of the cargo management device 10. However, in such a case, it is determined whether or not the communication environment is poor, and in a case where the communication environment is poor, transport is intentionally interrupted and manual operation is performed, which takes time and effort. In addition, in a case where the cargo P is packed together with the cargo management device 10, the cargo P is unpacked to operate the cargo management device 10, which may deteriorate the transport state of the cargo P. On the other hand, since the cargo management device 10 of the present embodiment can automatically switch between prohibition and recovery of transmission by the wireless circuit 16 in accordance with the communication environment, convenience of the cargo management device 10 can be improved.

In addition, when the cargo P is transported by an aircraft, the cargo P is accommodated in an air freight container in some cases. In the cargo management device 10 accommodated in the container of the aircraft, as a matter of course, the above-described configuration has an effect of preventing wireless transmission and suppressing unnecessary power. In addition, in a case where the cargo management device 10 performs wireless transmission in the aircraft, there is also a problem in that radio waves output at the time of transmission adversely affect the operation of the electronic device and the like of the aircraft. Therefore, there is also an effect of preventing wireless transmission in the aircraft in which wireless transmission is prohibited.

However, when the cargo P is transported by an aircraft, the cargo P is not accommodated in a cargo container in some cases. Even in such a case, with the cargo management device 10 of the present embodiment, wireless transmission in the aircraft can be prevented. Specifically, the transmission control unit 36 includes the area determination unit 37A, the acceleration determination unit 37C, and the atmospheric pressure determination unit 37D in addition to the radio quality determination unit 37B. Here, an operation until the cargo management device 10 is loaded onto the aircraft will be described. In a state in which the wireless circuit 16 is set in the normal transmission mode, for example, the cargo management device 10 is loaded on a truck or the like and transported to an airport area, and then is accommodated in a container as necessary and loaded on an aircraft. In the present embodiment, the area determination unit 37A first determines whether or not the current position of the cargo management device 10 is within the airport area (whether or not the first wireless transmission prohibition condition is satisfied). When the first wireless transmission prohibition condition is satisfied, the mode switching unit 38 switches the wireless circuit 16 to the transmission prohibition mode. That is, the wireless transmission is prohibited at a point of time when the cargo management device 10 enters the airport area. Here, if it is determined that the first wireless transmission prohibition condition is not satisfied due to the GPS module 11 not being able to acquire a GPS satellite signal or the like, it is subsequently determined whether or not the RSRP is smaller than the reference value (whether the second wireless transmission prohibition condition is satisfied) by the radio quality determination unit 37B, and the wireless transmission is prohibited at a point of time when the cargo management device 10 is accommodated in the cargo container. Here, in a case where it is determined that the cargo P is not accommodated in the cargo container or the second wireless transmission prohibition condition is not satisfied due to erroneous measurement or the like, the acceleration determination unit 37C further determines whether or not the acceleration of the cargo management device 10 corresponds to speeding up at the time of takeoff of the aircraft (whether the third wireless transmission prohibition condition is satisfied), and wireless transmission is prohibited at a point of time when the aircraft takes off.

Furthermore, in a case where it is determined that the third wireless transmission prohibition condition is not satisfied due to erroneous measurement or the like, it is further determined by the atmospheric pressure determination unit 37D whether or not the pressure applied to the cargo management device 10 corresponds to the regulated pressure of the aircraft (whether the fifth wireless transmission prohibition condition is satisfied), and the wireless transmission is prohibited at a point of time when the pressure in the aircraft falls below the reference pressure. In this manner, the determination is performed in stages from when the cargo management device 10 enters the airport area to when the aircraft flies, and the wireless transmission is prohibited when at least one of the wireless transmission prohibition conditions is satisfied. Therefore, even in a case where the cargo P is not accommodated in the cargo container or in a case where the current position data cannot be acquired, the wireless transmission in the aircraft in which the wireless transmission is prohibited can be prevented with high probability.

After the wireless circuit 16 is switched to the transmission prohibition mode, the four determination units 37A to 37D sequentially determine whether or not the fifth wireless transmission prohibition condition is satisfied, whether or not the fourth wireless transmission prohibition condition is satisfied (acceleration does not correspond to slowing down during landing of an aircraft, and the aircraft is still flying or the cargo P is not loaded on the aircraft), whether or not the first wireless transmission prohibition condition is satisfied, and whether or not the second wireless transmission prohibition condition is satisfied. Only when none of the wireless transmission prohibition conditions is satisfied, the mode switching unit 38 switches to the normal transmission mode and recovers the wireless transmission. As a result, it is possible to recover the wireless transmission in a state where the cargo management device is unloaded from the aircraft with a high probability, and it is possible to prevent the wireless transmission in the aircraft.

In addition, the transmission control unit 36 includes the radio quality determination unit 37B, and one of the wireless transmission prohibition conditions is that RSRP is smaller than the reference value. That is, in the present embodiment, since the cargo management device 10 uses the wireless circuit 16 used for the transport management of the cargo P to determine whether or not to prohibit wireless transmission, it is not necessary to install a new device for determining prohibition of wireless transmission, and the manufacturing cost can be suppressed. Similarly, since the area determination unit 37A, the acceleration determination unit 37C, and the atmospheric pressure determination unit 37D also determine prohibition of wireless transmission using the current position data, the movement data, and the atmospheric pressure data used for transport management of the cargo P, it is not necessary to install a new device, and the manufacturing cost can be suppressed.

Figure 4:
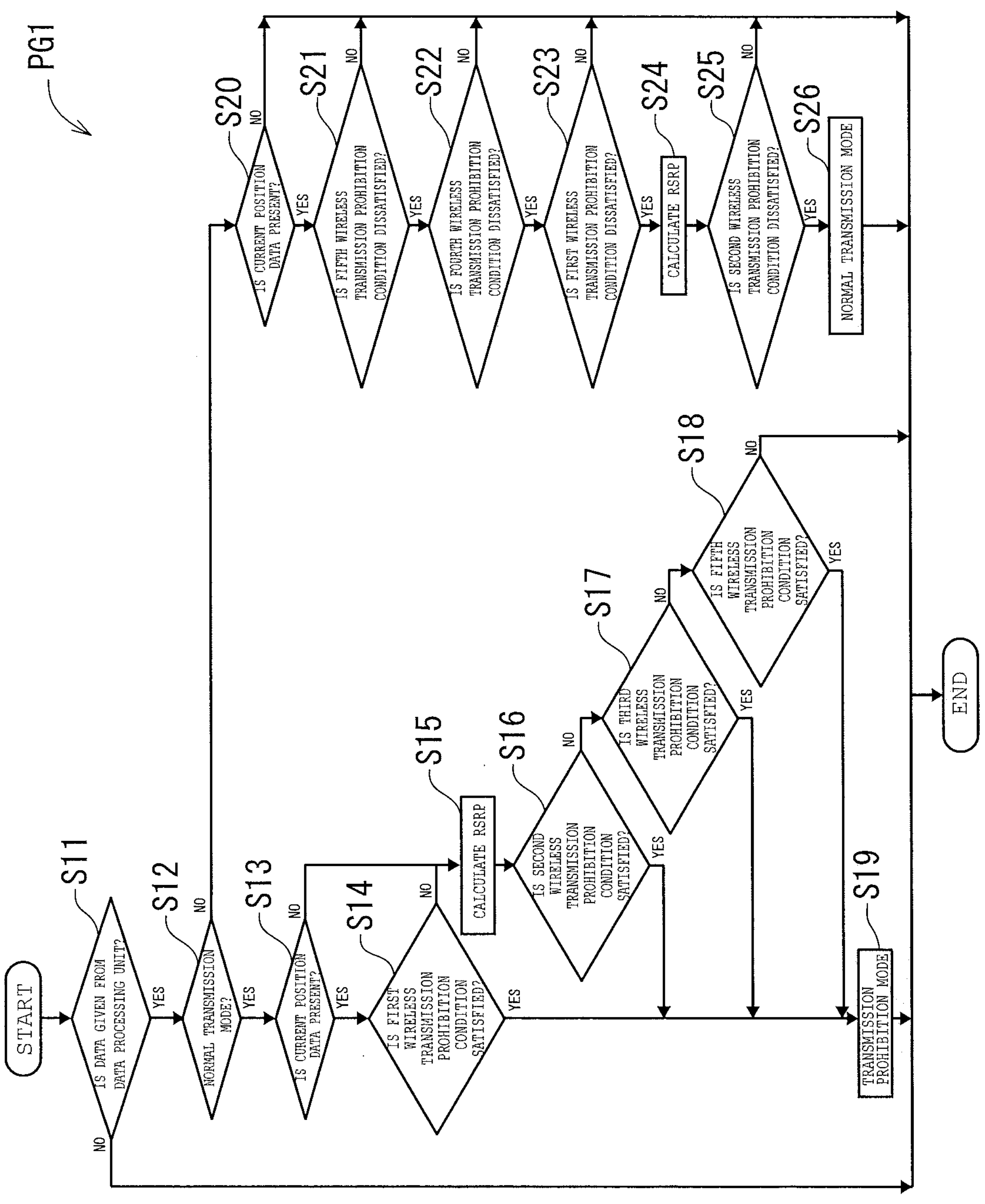
FIG. 4 is a flowchart of a communication control program.

Hereinafter, an example of the communication control program PG1 executed by the CPU 21A of the communication control apparatus 20 is illustrated in FIG. 4. As described above, the communication control program PG1 is executed every time data is given from the data processing unit 31 to the determination unit 37 (YES in S11). Then, it is determined whether or not the wireless circuit 16 is set to the normal transmission mode (S12). In the initial state, the wireless circuit 16 is set to the normal transmission mode. Then, in a case where the normal transmission mode is set (YES in S12), it is determined whether or not the first wireless transmission prohibition condition is satisfied, that is, whether or not the current position of the cargo management device 10 is located within the airport area (S14). In a case where the first wireless transmission prohibition condition is satisfied (YES in S14), the wireless circuit 16 is switched from the normal transmission mode to the transmission prohibition mode (S19), and exits from the communication control program PG1. Here, in a case where the GPS module 11 cannot receive a GPS satellite signal and the current position data is not given from the data processing unit 31 (NO in S13), the current position of the cargo management device 10 cannot be specified and thus cannot be determined, and the process proceeds to step S15 similarly to a case where the first wireless transmission prohibition condition is not satisfied.

In a case where the first wireless transmission prohibition condition is not satisfied (NO in S14), the wireless circuit 16 receives the reference signal of the wireless base stations 400, 401 and calculates RSRP in step S15, and it is determined whether or not the second wireless transmission prohibition condition is satisfied in step S16, that is, whether or not the value of RSRP is smaller than the reference value. Then, in a case where the second wireless transmission prohibition condition is satisfied (YES in S16), it is determined that the communication environment of the cargo management device 10 is poor (accommodated in the container of the aircraft), the wireless circuit 16 is switched from the normal transmission mode to the transmission prohibition mode in which the wireless transmission is stopped (S19), and exits from the communication control program PG1.

In a case where the second wireless transmission prohibition condition is not satisfied (NO in S16), it is determined in step S17 whether or not the third wireless transmission prohibition condition is satisfied, that is, whether or not the movement direction of the cargo management device 10 and the acceleration at that time correspond to speeding up at the time of takeoff of the aircraft. Then, in a case where the third wireless transmission prohibition condition is satisfied (YES in S17), it is determined that the cargo management device 10 is in the taking-off aircraft (loaded on the aircraft), the wireless circuit 16 is switched from the normal transmission mode to the transmission prohibition mode (S19), and exits from the communication control program PG1.

In a case where the third wireless transmission prohibition condition is not satisfied (NO in S17), it is determined in step S18 whether or not the fifth wireless transmission prohibition condition is satisfied, that is, whether or not the pressure applied to the cargo management device 10 is lower than the reference pressure. Then, in a case where the fifth wireless transmission prohibition condition is satisfied (YES in S18), it is determined that the cargo management device 10 is in the flying aircraft (loaded on the aircraft), the wireless circuit 16 is switched from the normal transmission mode to the transmission prohibition mode (S19), and exits from the communication control program PG1. On the other hand, in a case where the fifth wireless transmission prohibition condition is not satisfied (NO in S18), the wireless circuit 16 exits from the communication control program PG1 while being maintained in the normal transmission mode. That is, when at least one of the first, second, third, and fifth wireless transmission prohibition conditions is satisfied, the wireless circuit 16 is switched from the normal transmission mode to the transmission prohibition mode.

On the other hand, in a case where the wireless circuit 16 is set to the transmission prohibition mode (NO in S12), it is first determined whether or not the current position data is given from the data processing unit 31 in step S20. In a case where the current position data is not provided (NO in S20), the current position of the cargo management device 10 cannot be specified and therefore cannot be determined, and the wireless circuit 16 exits from the communication control program PG1 and is maintained in the transmission prohibition mode.

Then, in a case where the current position data is given from the data processing unit 31 (YES in S20), when all of the first, second, fourth, and fifth wireless transmission prohibition conditions are dissatisfied (YES in S21, YES in S22, YES in S23, YES in S25), it is determined that the cargo management device 10 has been unloaded from the aircraft, the wireless transmission of the wireless circuit 16 is switched from the transmission prohibition mode to the normal transmission mode (S26), and the wireless circuit 16 exits from the communication control program PG1. That is, the wireless circuit 16 cannot be switched to the normal transmission mode as long as at least one of the first, second, fourth, and fifth wireless transmission prohibition conditions is satisfied.

Note that the CPU 21A executing step S11 corresponds to the above-described determination unit 37, the CPU 21A executing steps S13, S14, S20, and S23 corresponds to the above-described area determination unit 37A, the CPU 21A executing steps S16 and S25 corresponds to the above-described radio quality determination unit 37B, the CPU 21A executing steps S17 and S22 corresponds to the above-described acceleration determination unit 37B, the CPU 21A executing steps S18 and S21 corresponds to the above-described atmospheric pressure determination unit 37D, the CPU 21A executing steps S15 and S24 corresponds to the above-described radio quality measurement unit 17, and the CPU 21A executing steps S19 and S26 corresponds to the above-described mode switching unit 38.

Second Embodiment

Next, a cargo management device 10 according to a second embodiment to which the present disclosure is applied will be described. In the following description, only differences from the first embodiment will be described, and redundant description of common configurations will be omitted.

In the communication control apparatus 20 of the first embodiment, the radio quality determination unit 37B has a configuration in which one reference value is set and wireless transmission is prohibited in a case where the acquired value of RSRP is smaller than the reference value, but the radio quality determination unit 37B of the present embodiment has a configuration in which a plurality of reference values are provided. Specifically, for example, three reference values whose values increase in the order of a first reference value, a second reference value, and a third reference value are provided, and when it is determined that the value of RSRP is smaller than the first reference value, the wireless transmission of the wireless circuit 16 is prohibited as in the first embodiment. When it is determined that the RSRP is the third reference value or more, the wireless transmission of the wireless circuit 16 is normally performed. When it is determined that the RSRP is the first reference value or more and less than the second reference value, the wireless transmission of the wireless circuit 16 is reduced to once every four times. When it is determined that the RSRP is the second reference value or more and less than the third reference value, the wireless transmission of the wireless circuit 16 is reduced to once every two times.

In this configuration, not only wireless transmission is prohibited in an environment where wireless transmission cannot be performed due to a poor communication environment, but also transmission is performed at a transmission interval in a communication environment where wireless transmission is not impossible but difficult. That is, since the manner of wireless transmission is flexibly changed according to the communication environment, it is possible to efficiently perform wireless transmission and suppress wasteful power consumption. As a result, the operation of the cargo management device 10 operated by the battery is further made to last long, and it is possible to continue monitoring of the cargo P during longer-distance transport than before. In the present embodiment, three reference values are provided, but two reference values may be provided, or four or more reference values may be provided. Note that the first to third reference values can be set, for example, by calculating the communication success probability at the value of each RSRP.

Third Embodiment

In the communication control apparatus 20 of the present embodiment, the area determination unit 37A allows the user to select a boundary of an area where wireless transmission is prohibited. Specifically, there are three settings of an insensitive setting, a normal setting, and a sensitive setting, and the user selects one of these settings in advance. In the normal setting, similarly to the first embodiment, an area where wireless transmission is prohibited is an airport area, and wireless transmission is prohibited when entry to the airport area is determined.

On the other hand, in the sensitive setting, for example, an area in which wireless transmission is prohibited is set to be extended to an area around the airport area, and wireless transmission is prohibited even when the cargo management device 10 approaches the airport area. In the insensitive setting, an area where wireless transmission is prohibited is set so as not to include the vicinity of the boundary of the airport area, and wireless transmission is not prohibited when merely passing through the vicinity of the airport. According to this configuration, for example, in the case of the cargo P for which there is no plan to use an aircraft, it is possible to prevent the wireless transmission from being unintentionally prohibited by setting the insensitive setting. In the case of using an aircraft, it is possible to reliably prevent the wireless transmission in the aircraft, so that the convenience of the cargo management device 10 can be further improved. In the present embodiment, three settings are provided, but for example, two settings of the sensitive setting and the normal setting may be provided, or four or more settings may be provided.

Other embodiments

In the above embodiments, the transmission control unit 36 includes the area determination unit 37A, the radio quality determination unit 37B, the acceleration determination unit 37C, and the atmospheric pressure determination unit 37D as the determination unit 37, but may include only the area determination unit 37A and the radio quality determination unit 37B to determine whether or not to prohibit wireless transmission by using two determinations of whether or not the current position data is within the airport area and whether or not the RSRP is smaller than the reference value.

Furthermore, the determination unit 37 may include only the radio quality determination unit 37B.

The communication control apparatus 20 including the transmission control unit 36 of the above embodiment is not limited to be installed in the cargo management device 10, and may be installed in other mobile terminals that perform wireless transmission. The mobile terminal may be a mobile phone such as a smartphone, or may be a terminal that is placed in the stomach of livestock and wirelessly transmits measurement data of body temperature and pH. In these cases, the determination unit 37 may include only the radio quality determination unit 37B to determine whether or not to prohibit wireless transmission.

In the above embodiment, in the normal transmission mode, determinations are performed in the order of the area determination unit 37A, the radio quality determination unit 37B, the acceleration determination unit 37C, and the atmospheric pressure determination unit 37D, and if there is a preceding determination that satisfies the wireless transmission prohibition condition, the wireless transmission is prohibited without performing the subsequent determination(s). However, another configuration may be adopted such that after all the determinations are performed, it is determined whether or not the wireless transmission is prohibited on the basis of four determination results.

In addition, also in the transmission prohibition mode, the determinations may not be performed in the order of the atmospheric pressure determination unit 37D, the acceleration determination unit 37C, the area determination unit 37A, and the radio quality determination unit 37B, but the determination as to whether or not to recover the wireless transmission may be performed on the basis of four determination results after all the determinations are performed.

In the above embodiments, the wireless transmission prohibited area is defined as an airport area, but is not limited to this area as long as the area is adversely affected by the transmission of the wireless circuit 16, for example.

In the above embodiment, the transport status data D1 accumulated in the storage unit 33 of the data logger 15 is deleted after being transmitted to the cloud server 50. However, the transport status data D1 may be kept stored without being deleted.

Furthermore, the storage unit 33 may be a portable storage medium such as a USB memory, an SD card, or the like.

In the communication control apparatus 20, the data logger 15 may perform wireless transmission each time the data processing unit 31 gives the current position data or the like to the data logger 15.

Appendixes

Hereinafter, feature groups extracted from the above embodiments will be described while showing effects and the like as necessary. Note that, in the following, for easy understanding, corresponding configurations in the above embodiments will be appropriately indicated in parentheses or the like, but these feature groups are not limited to the specific configurations indicated in the parentheses or the like.

The present application includes a plurality of features described below. In the description of these features, the numbers in parentheses are reference numerals corresponding to the parts in the above embodiments.

Feature 1

A communication control apparatus (20) that is provided in a mobile terminal (10) performing wireless transmission of information to a communication network via a wireless base station, measures radio quality on the basis of the signal transmitted from the wireless base station, and restricts the wireless transmission of the mobile terminal (10) in a case where a parameter indicating the radio quality is smaller than a predetermined reference value.

Feature 2

A mobile terminal (10) including:

the communication control apparatus (20) according to feature 1; and a wireless circuit (16) that acquires position data from a GPS module (11) and performs the wireless transmission of position information based on the position data using the wireless communication network, the mobile terminal (10) moving together with a cargo (P) in order to monitor the cargo (P).

Feature 3

The mobile terminal (10) according to feature 2, in which the parameter is RSRP, and the mobile terminal (10) prohibits the wireless transmission in a case where the RSRP is smaller than the reference value.

According to feature 1, the wireless transmission of the mobile terminal (10) is restricted in a case where the radio quality is smaller than a predetermined reference value. That is, since wireless transmission of the mobile terminal (10) is restricted under a poor communication environment, wasteful power consumption is suppressed. Examples of the parameter indicating the radio quality include RSRP (feature 3).

The configuration in which the wireless transmission is restricted may be, for example, such that the frequency of the wireless transmission is lowered, the number of times of retransmission when the wireless transmission is not received is reduced, or the wireless transmission is prohibited as in feature 3. In addition, for example, a plurality of reference values may be set, the frequency of wireless transmission may be lowered in a case where the parameter is equal to or more than the first reference value and equal to or less than the second reference value, and the wireless transmission may be prohibited in a case where the parameter is less than the first reference value.

In addition, if the mobile terminal (10) including this communication control apparatus (20) is installed in the cargo (P) as in feature 2, and the cargo (P) is monitored by wirelessly transmitting the position information on the basis of the position data acquired from the GPS module (11), the operation of the mobile terminal (10) can be made longer, and monitoring can be continued during longer-distance transport than before.

Feature 4

The mobile terminal (10) according to the feature 3, in which the communication control apparatus (20) is configured to prohibit the wireless transmission in a case where any one of a plurality of wireless transmission prohibition conditions is satisfied, the plurality of wireless transmission prohibition conditions including a current position based on the position data from the GPS module (11) being a wireless transmission prohibited area, and the RSRP being smaller than the reference value.

Feature 5

The mobile terminal (10) according to feature 4, in which the communication control apparatus (20) cancels the prohibition of the wireless transmission in a case where all of the plurality of wireless transmission prohibition conditions are dissatisfied.

Feature 6

The mobile terminal (10) according to feature 4 or 5, further including an atmospheric pressure sensor (13), in which the wireless transmission prohibition condition includes a detection result of the atmospheric pressure sensor (13) being lower than a reference pressure.

Feature 7

The mobile terminal (10) according to any one of features 3 to 5, further including:

an acceleration sensor (12); and a takeoff and landing detection unit (37C) to detect takeoff and landing of the mobile terminal (10) on board an airplane on the basis of a detection result of the acceleration sensor (12), in which the wireless transmission prohibition condition includes the mobile terminal (10) being after takeoff and before landing.

With the mobile terminal (10) according to feature 4, the wireless transmission is prohibited when any one of a plurality of wireless transmission prohibition conditions is satisfied, the plurality of wireless transmission prohibition conditions including a condition that the current position of the cargo (P) based on the position data from the GPS module (11) is in the wireless transmission prohibited area and a condition that the RSRP is smaller than the reference value. For example, if the wireless transmission prohibited area is set to an airport area, and the reference value is set on the basis of a value when the cargo (P) is in a metal cargo container for the aircraft, it is possible to prevent with high probability the mobile terminal (10) from performing wireless transmission in the aircraft where adverse effects due to generation of electromagnetic waves or the like are desired to be eliminated.

Furthermore, the pressure in the aircraft is adjusted to a pressure lower than the atmospheric pressure in order to reduce the influence of the atmospheric pressure change during flight. Therefore, as in the mobile terminal (10) according to feature 6, the atmospheric pressure sensor (13) may be provided, and the detection result of the atmospheric pressure sensor (13) being lower than the reference pressure may be one of the wireless transmission prohibition conditions. Alternatively, as in the mobile terminal (10) according to feature 7, the acceleration sensor (12) may be provided and detect takeoff and landing of the aircraft, and the aircraft being after takeoff and before landing may be one of the wireless transmission prohibition conditions.

In addition, if at least one of these wireless transmission prohibition conditions is satisfied, there is a possibility that the cargo is located within the wireless transmission prohibited area. Therefore, as in feature 5, by canceling the prohibition of the wireless transmission in a case where all of the plurality of wireless transmission prohibition conditions are dissatisfied, it is possible to prevent the wireless transmission within the wireless transmission prohibited area with high probability. In addition, since the user does not need to manually switch between prohibition and recovery of wireless transmission, the convenience of the mobile terminal (10) can be improved.

Note that, although specific examples of the technology included in the claims are disclosed in the present specification and the drawings, the technology described in the claims is not limited to these specific examples, and includes those obtained by variously modifying and changing the specific examples, and also includes those obtained by singly extracting a part from the specific examples.

DESCRIPTION OF THE REFERENCE NUMERAL

10 cargo management device
11 GPS module
12 acceleration sensor
13 atmospheric pressure sensor
16 wireless circuit
20 communication control apparatus
37C acceleration determination unit
P cargo

The invention claimed is:

1. A mobile terminal configured to move together with a cargo, to acquire position data from a GPS module, and to perform wireless transmission of position information based on the position data to a communication network via a wireless base station, the mobile terminal comprising:

a processor configured to:

prohibit the wireless transmission in a case where any one of a plurality of wireless transmission prohibition conditions is satisfied, the plurality of wireless transmission prohibition conditions including a first wireless transmission prohibition condition that a current position based on the position data is a wireless transmission prohibited area and a second wireless transmission prohibition condition that a reference signal received power (RSRP) of a signal transmitted from the wireless base station is smaller than a preset reference value, and determine whether the second wireless transmission prohibition condition is satisfied on condition that the first wireless transmission prohibition condition is not satisfied, and an acceleration sensor, wherein the processor is further configured to detect takeoff and landing of the mobile terminal on board an airplane based on a detection result of the acceleration sensor, the plurality of wireless transmission prohibition conditions includes a third wireless transmission prohibition condition that the mobile terminal is after the takeoff and before the landing, and the processor is further configured to determine whether the third wireless transmission prohibition condition is satisfied on condition that the second wireless transmission prohibition condition is not satisfied.

2. The mobile terminal according to claim 1, further comprising an atmospheric pressure sensor, wherein the processor is further configured to determine whether a wireless transmission prohibition condition that a detection result of the atmospheric pressure sensor is lower than a reference pressure is satisfied on condition that the third wireless transmission prohibition condition is not satisfied.

3. The mobile terminal according to claim 1, wherein the processor is further configured to cancel the prohibition of the wireless transmission in a case where none of the plurality of wireless transmission prohibition conditions is satisfied.

4. The mobile terminal according to claim 2, wherein the processor is further configured to cancel the prohibition of the wireless transmission in a case where none of the plurality of wireless transmission prohibition conditions is satisfied.

* * * * *